United States Patent
Hak

(10) Patent No.: US 7,083,067 B2
(45) Date of Patent: *Aug. 1, 2006

(54) UNIVERSAL SEED METERING DISC

(76) Inventor: Larry Hak, 1818 Feasby-Wisner Rd., Convoy, OH (US) 45832

( * ) Notice: Subject to any disclaimer, the term of this patent is extended or adjusted under 35 U.S.C. 154(b) by 0 days.

This patent is subject to a terminal disclaimer.

(21) Appl. No.: 10/605,395

(22) Filed: Sep. 27, 2003

(65) Prior Publication Data

US 2004/0112913 A1 Jun. 17, 2004

Related U.S. Application Data

(63) Continuation of application No. 09/952,405, filed on Sep. 14, 2001, now Pat. No. 6,634,522.

(60) Provisional application No. 60/232,735, filed on Sep. 15, 2000.

(51) Int. Cl.
*A01C 7/12* (2006.01)
*A01C 7/20* (2006.01)

(52) U.S. Cl. ................ 221/265; 111/177; 111/183; 221/277

(58) Field of Classification Search ............... 221/258, 221/263, 265, 277, 211, 266; 111/177, 183, 111/184, 77, 185
See application file for complete search history.

(56) References Cited

U.S. PATENT DOCUMENTS

| | | | | |
|---|---|---|---|---|
| 4,047,638 A | * | 9/1977 | Harrer et al. | 221/266 |
| 4,600,122 A | * | 7/1986 | Lundie et al. | 221/211 |
| 5,058,766 A | * | 10/1991 | Deckler | 221/254 |
| 5,542,364 A | * | 8/1996 | Romans | 111/185 |
| 6,352,042 B1 | * | 3/2002 | Martin et al. | 111/184 |
| 6,634,522 B1 | * | 10/2003 | Hak | 221/265 |

* cited by examiner

*Primary Examiner*—Douglas Hess
(74) *Attorney, Agent, or Firm*—Calfee, Halter & Griswold LLP

(57) ABSTRACT

The present invention is a seed metering disc for the distribution and planting of various sizes of seeds. The seed metering disc is defined by a set of seed cells which can accommodate various seed sizes in that each cell is defined by a recess, seed cell retention wall, and seed cell retention plate.

8 Claims, 1 Drawing Sheet

UNIVERSAL SEED METERING DISC

CROSS REFERENCE TO RELATED APPLICATIONS

This application is a continuation of U.S. patent application Ser. No. 09/952,405 filed Sep. 14, 2001, which claims priority to U.S. Provisional Application No. 60/232,735, filed on Sep. 15, 2000 now U.S. Pat. No. 6,634,522, the entire disclosures of which are incorporated herein by reference.

BACKGROUND OF INVENTION

The present invention is directed to a universal seed metering disc. In particular, it relates to a seed metering disc with a seed retention plate defining a seed cell. It finds particular application in use with varying sizes of seeds.

In many agricultural areas, large planters equipped with numerous row units are used to plant crop fields. The row units follow the planter and discharge seeds into the soil at a selected rate. In order to create uniformity and proper crop distance, seed meters are attached to the row units. Large seed reservoirs store the seeds as the planters move across the crop fields. Seeds are released from the seed reservoirs and are evenly dispersed between the row units. The seeds travel down the row unit and are discharged onto a rotating seed disc wherein the seeds gravitate into a series of specially-molded seed pockets, spaced to provide adequate crop distance. The seeds are retained in the seed pockets and then individually enter seed cells located at the periphery of the seed discs. The seed cells are typically sized to retain a single seed of a particular size and deliver it to the soil at a fixed point in the rotation of the seed disc. See, e.g., U.S. Pat. No. 5,058,766 assigned to Kinze Mfg. Due to the design of the seed cells, seed metering discs will only distribute seeds properly if the seeds are of the size the seed discs are designed to handle. Therefore, when planting more than one type of crop, and thus using different seed sizes, more than one set of seed metering discs must be purchased and installed to allow for proper seed metering. While the large size seed metering discs can be used for smaller seeds, the design of the seed cells for large discs does not allow for proper delivery of small seeds to the soil. Instead of falling at the designated seed delivery point, the smaller seeds slip from the seed cells at various points during seed disc rotation and are thus delivered in a non-uniform pattern. Typically, the smaller seeds fall out the backside of the seed cell and therefore fall to the soil outside the designated crop row.

SUMMARY OF INVENTION

The present invention relates to a seed metering device and more particularly to an improved universal seed metering device which permits the planter to use one set of seed metering discs to properly deliver seeds of varying sizes to the designated crop rows. It provides a seed retention plate located on the backside of a seed metering disc for reducing seed loss through the backside of a seed cell, thereby allowing smaller seeds to be properly dispersed using larger seed metering discs.

An advantage of the present invention is that seeds of varying sizes may be planted by one metering disc or one set of metering discs. Still further advantages of the present invention will become apparent to those of ordinary skill in the art upon reading and understanding the following detailed description of embodiments of the present invention.

BRIEF DESCRIPTION OF DRAWINGS

In the accompanying drawings which are incorporated in and constitute a part of the specification, embodiments of the invention are illustrated, which, together with a general description of the invention given above, and the detailed description given below, serve to exemplify the principles of the invention.

DETAILED DESCRIPTION

Figure 1:
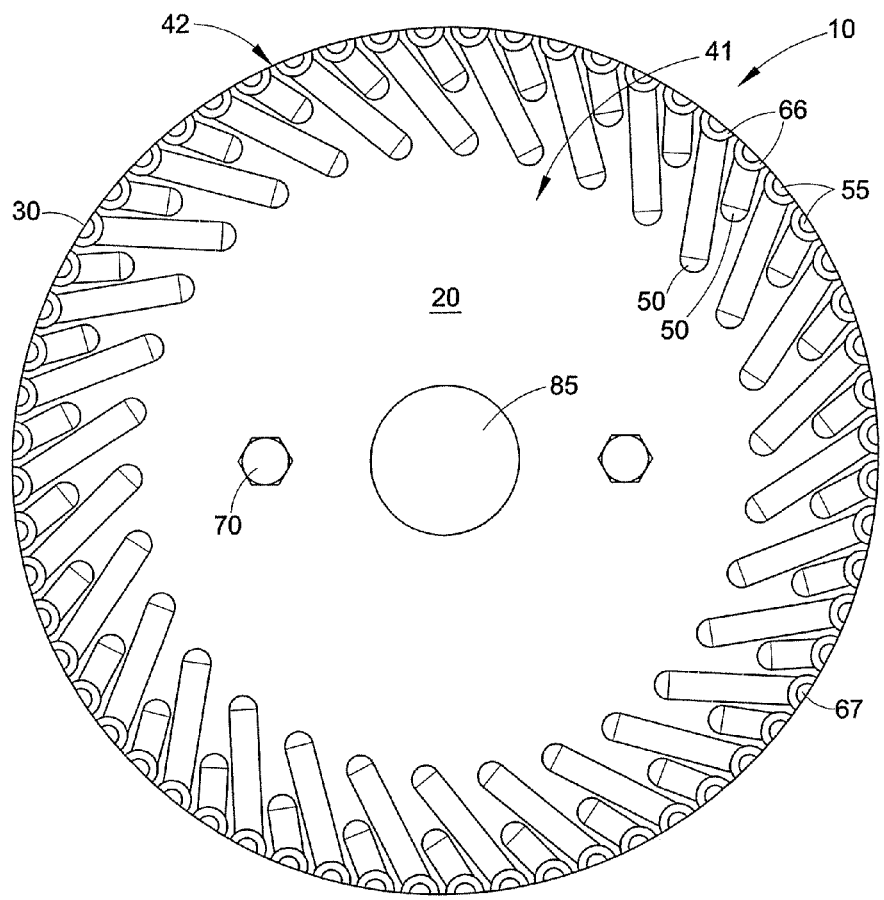
FIG. 1 is a front view of an improved universal seed metering disc.
Figure 2:
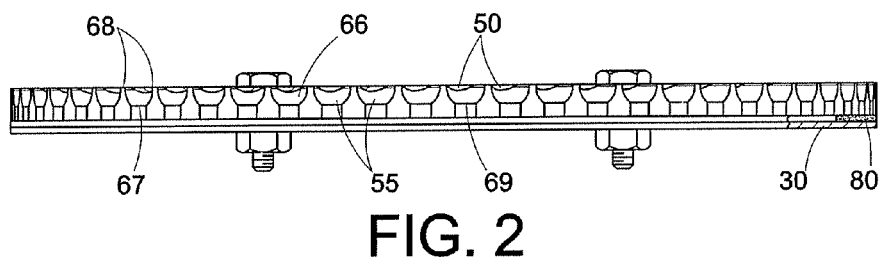
FIG. 2 is a cross-sectional view of the disc of FIG. 1.

The present invention is an improved seed metering disc for a seed planter which provides for universal seed use. Referring to FIG. 1 and FIG. 2, an exemplary improved universal seed metering disc 10 comprises a seed disc 20 and a seed retention plate 30. Seed disc 20 has a front side 41 and a backside 42, wherein the front side has a plurality of grooved seed pockets 50 and seed cells 55. The seed pockets 50 are generally radially situated around the front side 42 of the seed disc 20. Each of the seed pockets 50 comprise a channel which leads directly into a seed cell 55. Each channel may be round and smooth to facilitate seed movement within the seed pockets 50. Each seed cell 55 has a recess 66, a seed delivery opening 67 and seed cell retention walls 68. Each seed cell 55 is further defined by seed retention plate 30 affixed to the seed disc 20 such as to form a backside of each seed cell 55 where the recess 66 ends at break 69.

Seed retention plate 30 is substantially similar in shape and diameter as the seed disc 20 and is made from any suitable material, including a weather-safe durable material, such as a coated aluminum. The seed retention plate 30 can be affixed to the seed disc 20 by any appropriate fastening means, including a set of one or more fastening bolts 70 that pass through the front side 41 of the seed disc 20 and through the seed retention plate 30 where the bolts can be secured by one or more locking nuts. The locking nuts should be fastened tightly such as to provide contact or near contact between the seed disc 20 and the seed retention plate 30, wherein the distance between seed disc 20 and seed retention plate 30 is small enough to prohibit seeds from sliding between the seed disc 20 and the seed retention plate 30.

In one embodiment, as shown in FIG. 2, a gasket 80, comprised of either sponge, foam, or other suitable material, is placed between the seed disc 20 and the seed retention plate 30. The gasket assists in holding the seeds in the seed cells 55 by increasing the friction force which the seed must overcome in order to slide from the seed cell 55. The gasket 80 further provides a means for ensuring contact or near contact between the seed disc 20 and the seed retention plate 30, and fills any space therebetween.

Seeds stored in a seed reservoir of a planter are dropped onto the seed disc 20 which is rotating in a vertical plane along a shaft which contacts and retains the seed metering disc 10 through the shaft hole 85. In an embodiment, more than one seed metering discs 10 are used by dividing the planter into a set number of row units, connecting one seed metering disc 10 per row unit, and evenly delivering seeds from the seed reservoir to each of the row units.

The seed disc 20 rotates at a set speed creating a centrifugal force which, along with a brush system as described in U.S. Pat. No. 5,058,766, forces the seeds into the seed pockets 50. The rotational force pushes the seeds along the channel of the seed pockets 50 until the seeds reach the seed cells 55. The seeds then fall individually, or in small seed packets, into the recess 66 of seed cells 55 and are retained within the seed cells 55 by the seed retention walls 68 and the seed retention plate 30. Smaller seeds that would otherwise slide out break 69 and out the backside 42 in the recess 66 of the seed cell 55 are held in place by the seed retention plate 30. When the seed metering disc 10 reaches a fixed point in its rotation, the seeds are thrust from the seed cells 55 out the seed delivery opening 67 and into the corresponding crop row.

While the present invention has been illustrated by the description of embodiments thereof, and while the embodiments have been described in detail, it is not the intention of the applicant to restrict or in any way limit the scope of the appended claims to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept.

The invention claimed is:

1. A seed metering disc for metering seeds of varying sizes, comprising:
   a seed retention plate having a front side; and
   a seed disc having a front side, a backside, at least one grooved seed pocket on the front side extending generally radially towards the periphery of the seed disc and defining at least one seed cell retention wall at an end of the seed pocket, and at least one seed cell defined by the at least one seed cell retention wall and the front side of the seed retention plate;
   wherein the front side of the retention plate abuts the backside of the seed disc.

2. The seed metering disc of claim 1, wherein the retention plate and seed disc are generally circular and of substantially similar diameter.

3. The seed metering disc of claim 1 wherein said seed cell is defined by at least four surfaces, including said seed cell retention wall and said front side of the seed retention plate.

4. The seed metering disc of claim 3, wherein said at least four surfaces further include two side surfaces.

5. The seed metering disc of claim 3, wherein said seed disc and said at least four surfaces are integrally formed.

6. The seed metering disc of claim 3, wherein said seed disc and at least two of said at least four surfaces are integrally formed.

7. The seed metering disc of claim 1 wherein said at least one seed cell comprises a recess located at said periphery of the seed disc, wherein said recess captures seeds and prevents such seeds from exiting said recess through the backside of the seed disc.

8. The seed metering disc of claim 7 wherein said seed retention plate is affixed to said seed disc.

* * * * *